United States Patent
Inoue et al.

(10) Patent No.: US 11,656,074 B2
(45) Date of Patent: May 23, 2023

(54) CALIBRATION METHOD

(71) Applicant: MITUTOYO CORPORATION, Kanagawa (JP)

(72) Inventors: Yuto Inoue, Ibaraki (JP); Masayuki Nara, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/693,845

(22) Filed: Mar. 14, 2022

(65) Prior Publication Data

US 2022/0333920 A1 Oct. 20, 2022

(30) Foreign Application Priority Data

Apr. 7, 2021 (JP) .............................. JP2021-065439

(51) Int. Cl.
*G01B 21/04* (2006.01)
*G01B 5/008* (2006.01)

(52) U.S. Cl.
CPC ........... *G01B 21/042* (2013.01); *G01B 5/008* (2013.01)

(58) Field of Classification Search
CPC .................................................... G01B 21/042
USPC .......................................................... 33/502
See application file for complete search history.

(56) References Cited

U.S. PATENT DOCUMENTS

| | | | | |
|---|---|---|---|---|
| 4,962,591 A * | 10/1990 | Zeller | ................... | G01B 21/042 73/1.79 |
| 5,125,261 A * | 6/1992 | Powley | ................... | G01B 3/30 33/502 |
| 5,501,096 A * | 3/1996 | Stettner | ................ | G01B 21/042 73/1.79 |
| 5,813,128 A * | 9/1998 | Bailey | .................. | G01B 21/042 73/1.79 |
| 6,023,850 A | 2/2000 | Trapet | | |
| 6,836,323 B2 * | 12/2004 | Schmadel | ............ | G01B 21/042 33/558.2 |
| 7,055,367 B2 * | 6/2006 | Hajdukiewicz | ...... | G01B 21/042 702/155 |
| 7,712,224 B2 * | 5/2010 | Hicks | ................... | G01B 21/045 33/502 |
| 7,900,367 B2 * | 3/2011 | Sutherland | ........... | G01B 21/042 33/502 |
| 10,323,938 B2 * | 6/2019 | Baer | ..................... | G01B 21/042 |
| 2022/0042782 A1 | 2/2022 | Nara | | |
| 2022/0170738 A1 * | 6/2022 | Wiest | .................... | G01B 21/042 |
| 2022/0221261 A1 * | 7/2022 | Asanuma | ............... | G01B 5/008 |

* cited by examiner

*Primary Examiner* — George B Bennett
(74) *Attorney, Agent, or Firm* — Greenblum & Bernstein, P.L.C.

(57) ABSTRACT

A calibration method includes: measuring, with a CMM, a ball-to-ball distance of a plurality of edges of an inspection gauge installed in a first posture, a second posture and a third posture, and calculating a calibration value calibrating a ball-to-ball distance between two balls at respective ends of a plurality of edges of the inspection gauge by solving simultaneous equations including the ball-to-ball distance of the plurality of edges of the inspection gauge installed in the first posture, the ball-to-ball distance of the plurality of edges of the inspection gauge installed in the second posture, the ball-to-ball distance of the plurality of edges of the inspection gauge installed in the third posture, and a measurement error of the CMM at the measurement position.

8 Claims, 8 Drawing Sheets

CALIBRATION METHOD

CROSS-REFERENCE TO RELATED APPLICATIONS

The present application claims priority to Japanese Patent Applications number 2021-065439, filed on Apr. 7, 2021. The contents of this application are incorporated herein by reference in their entirety.

BACKGROUND OF THE INVENTION

The present disclosure relates to a calibration method for an inspection gauge for CMM.

For an inspection of measurement accuracy of a coordinate measuring machine (CMM), an inspection gauge in which a ball is placed at each vertex of a polyhedron or the like is used (for example, see U.S. Pat. No. 6,023,850). A true value of each ball-to-ball distance in the inspection gauge is measured in advance with a reference instrument such as an optical interferometer. As a method of calibrating gauges that have balls as measurement elements such as regular tetrahedron gauges and cubic gauges, a method of calibrating by comparing each ball-to-ball distance of a gauge with a ball bar having a calibration value is known.

In a method described in U.S. Pat. No. 6,023,850, it is necessary to measure true values of all of the ball-to-ball distances of an inspection gauge using a reference instrument when calibrating the inspection gauge. Therefore, there is a problem that calibration work of the reference instrument is complicated.

SUMMARY

The present disclosure focuses on this point and its object is to provide a calibration method capable of reducing the time required for calibration work of an inspection gauge.

A calibration method according to the first aspect of the present disclosure is a calibration method for calibrating an inspection gauge in which a ball is arranged at each vertex of a regular tetrahedron, the method includes the steps of: installing the inspection gauge in a first posture on a measurement table of a CMM; measuring a ball-to-ball distance of a plurality of edges of the inspection gauge installed in the first posture using the CMM in which a measurement error at a measurement position, where a first edge among the plurality of edges of the inspection gauge installed in the first posture is located, is identified; installing the inspection gauge on the measurement table in a second posture in which a second edge different from the first edge among the plurality of edges matches the measurement position where the first edge was in the first posture by rotating the inspection gauge about a first rotational symmetry axis after measuring the ball-to-ball distance of the plurality of edges; measuring a ball-to-ball distance of a plurality of edges of the inspection gauge installed in the second posture using the CMM; installing the inspection gauge on the measurement table in a third posture in which a third edge different from the first edge and the second edge among the plurality of edges matches the measurement positon by rotating the inspection gauge about a second rotational symmetry axis different from the first rotational symmetry axis after measuring the ball-to-ball distance of the plurality of edges of the inspection gauge installed in the second posture; measuring a ball-to-ball distance of a plurality of edges of the inspection gauge installed in the third posture using the CMM; and calculating a calibration value calibrating a ball-to-ball distance between two balls at respective ends of a plurality of edges of the inspection gauge by solving simultaneous equations including the ball-to-ball distance of the plurality of edges of the inspection gauge installed in the first posture, the ball-to-ball distance of the plurality of edges of the inspection gauge installed in the second posture, the ball-to-ball distance of the plurality of edges of the inspection gauge installed in the third posture, and the measurement error of the CMM at the measurement position.

A calibration method according to the second aspect of the present disclosure is a calibration method for calibrating an inspection gauge in which a ball is arranged at each vertex of a regular tetrahedron, the method comprising the steps of: installing the inspection gauge in a first posture on a measurement table of a CMM; measuring a ball-to-ball distance of a plurality of edges of the inspection gauge installed in the first posture by the CMM in which a measurement error at a first measurement position, where a first edge included in a base of the regular tetrahedron among the plurality of edges of the inspection gauge installed in the first posture is located, and the measurement error at a second measurement position, where a second edge not included in the base is located, are identified; installing, on the measurement table, the inspection gauge in a second posture in which a third edge different from the first edge and the second edge among the plurality of edges matches the first measurement position where the first edge was in the first posture and a fourth edge different from the first edge, the second edge, and the third edge matches the second measurement position where the second edge was in the second posture by rotating the inspection gauge about a rotational symmetry axis orthogonal to the base after measuring the ball-to-ball distance of the plurality of edges of the inspection gauge installed in the first posture; measuring a ball-to-ball distance of a plurality of edges of the inspection gauge installed in the second posture by the CMM; and calculating a calibration value calibrating a ball-to-ball distance between two balls at respective ends of a plurality of edges of the inspection gauge by solving simultaneous equations including the ball-to-ball distance of the plurality of edges of the inspection gauge installed in the first posture, the ball-to-ball distance of the plurality of edges of the inspection gauge installed in the second posture, and the measurement error of the CMM at the first measurement position and the second measurement position.

DETAILED DESCRIPTION OF THE DISCLOSURE

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

First Embodiment

[Outline of a Calibration Method]

Figure 1A:
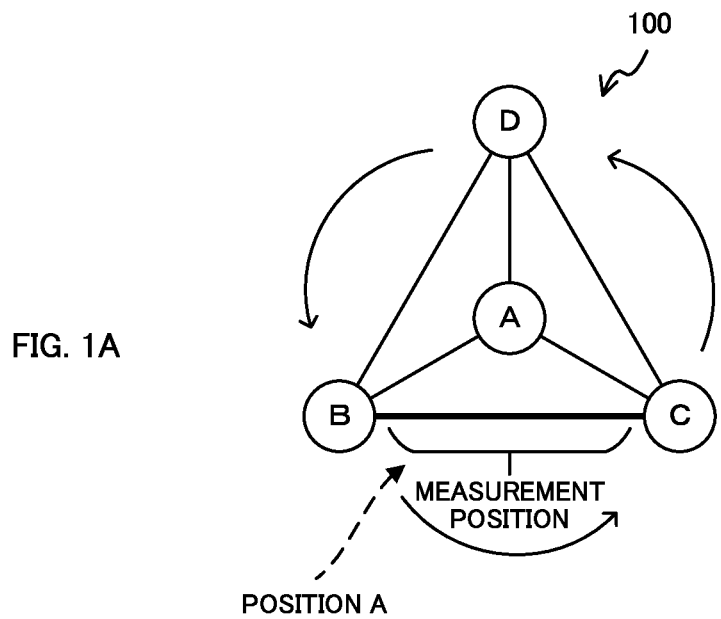
FIGS. 1A to 1C each show an outline of a calibration method according to a first embodiment.
Figure 1B:
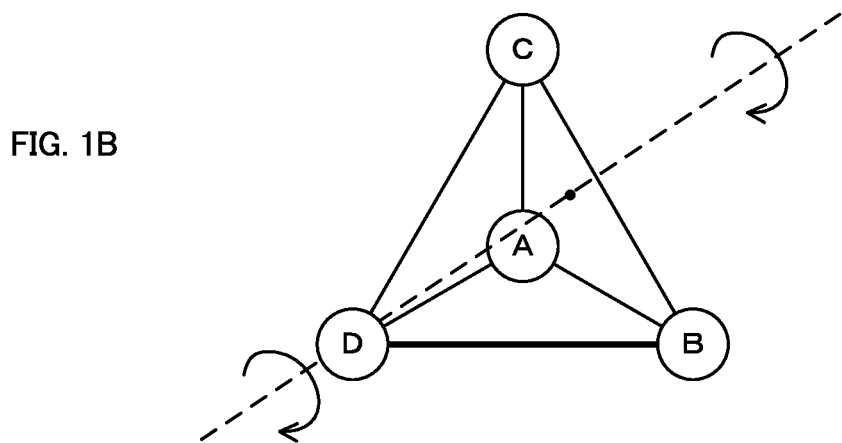
Figure 1C:
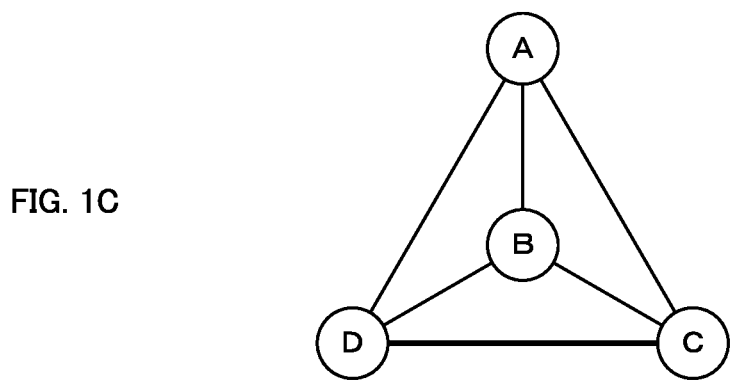

A calibration method according to a first embodiment is a method for calibrating an inspection gauge used for an inspection of measurement accuracy of a coordinate measuring machine (CMM). FIGS. 1A to 1C each show an outline of the calibration method of the first embodiment. In this calibration method, the inspection gauge is mounted on the CMM such that some edges of the inspection gauge match positions on the CMM identified by a reference instrument such as a laser interferometer. Then, using the CMM, a distance between balls at the ends of each edge of the inspection gauge is measured in a plurality of postures obtained by rotating the inspection gauge about a predetermined rotational symmetry axis for a predetermined number of times. In a case where the CMM is used, since the distance can be automatically measured just by setting a position to be measured in advance, the time required for calibration can be reduced as compared with a case where reference instruments are to be set up according to the number of edges to be calibrated by such a calibration method.

In the calibration method according to the first embodiment, for each of three postures, the length of one edge (a distance between balls at respective ends of the edge) is measured at the position of the CMM calibrated by the reference instrument and a distance between balls at respective ends of at least some other edges is measured at an uncalibrated position in the CMM, thereby calibrating the inspection gauge. In this calibration method, the ball-to-ball distance of each edge is measured using the CMM for each of (i) a first posture, (ii) a second posture after rotating the inspection gauge only once about a first rotational symmetry axis from the first posture, and (iii) a third posture after rotating the inspection gauge only once about a second rotational symmetry axis from the second posture. FIG. 1A shows how an inspection gauge 100 is installed in the first posture. FIG. 1B shows how the inspection gauge 100 is installed in the second posture. FIG. 1C shows how the inspection gauge 100 is installed in the third posture.

As shown in FIG. 1A, the inspection gauge 100 has a regular tetrahedron shape, and measurement elements, balls A to D, are arranged at each vertex of the regular tetrahedron. In an example of FIG. 1A, it is assumed that the inspection gauge 100 is installed in the first posture on a measurement table of the CMM. At each vertex of the inspection gauge 100, a measurement element having a shape other than a sphere may be arranged. The measurement elements are assumed to be capable of measuring coordinates of a feature point such as a center, an edge, or the like of the ball using the CMM.

The CMM measures the ball-to-ball distance between two balls. The CMM measures, among the plurality of edges of the regular tetrahedron of the inspection gauge 100, a first ball-to-ball distance between the ball B and the ball C at respective ends of an edge (hereinafter, also referred to as a first edge) corresponding to a measurement position (a position A indicated by a broken line arrow) indicated by a thick line in FIG. 1A. It is assumed that a measurement error when the CMM measures the ball-to-ball distance at this measurement position is identified in advance by a method which will be described later. The CMM also measures ball-to-ball distances corresponding to five edges other than the first edge of the inspection gauge 100 installed in the first posture.

After the CMM has measured the plurality of ball-to-ball distances of the inspection gauge 100 installed in the first posture, the inspection gauge 100 is installed on the measurement table in the second posture, which is obtained by rotating about the first rotational symmetry axis, as shown by arrows in FIG. 1A. The inspection gauge 100 is installed at the same position as in the first posture in a coordinate system of the CMM. The first rotational symmetry axis is an axis passing through the ball A and orthogonal to a plane including the ball B, the ball C, and the ball D.

FIG. 1B shows how the inspection gauge 100 is installed in the second posture. In the second posture, an edge (edge sandwiched by the balls B and D, hereinafter also referred to as a second edge) different from the first edge among the plurality of edges of the regular tetrahedron of the inspection gauge 100 moves so as to match with the measurement position where the first edge was in the first posture. The CMM measures a second ball-to-ball distance between the balls B and D at respective ends of the second edge among the plurality of edges of the inspection gauge 100 installed in the second posture. The CMM measures ball-to-ball distances corresponding to five edges other than the second edge of the inspection gauge 100 installed in the second posture.

After the CMM has measured the ball-to-ball distances of the plurality of edges of the inspection gauge 100 installed in the second posture, the inspection gauge 100 is installed on the measurement table in the third posture that is obtained by rotating about the second rotational symmetry axis. The inspection gauge 100 is installed at the same position as in the second posture in the coordinate system of the CMM. The second rotational symmetry axis is different from the first rotational symmetry axis. The second rotational symmetry axis is indicated by a broken line in FIG. 1B. In an example of FIG. 1B, the second rotational symmetry axis passes through the ball D and is orthogonal to a plane including the ball A, the ball B, and the ball C.

FIG. 1C shows how the inspection gauge 100 is installed in the third posture. In the third posture, among the plurality of edges of the regular tetrahedron of the inspection gauge 100, an edge (edge sandwiched by the balls C and D, hereinafter also referred to as a third edge) different from the first edge and the second edge moves to the position that matches the measurement position. The CMM measures a third ball-to-ball distance between the balls C and D at respective ends of the third edge among the plurality of edges of the inspection gauge 100 installed in the third posture. The CMM also measures ball-to-ball distances corresponding to five edges other than the third edge among the plurality of edges of the inspection gauge 100 installed in the third posture.

The CMM 200 calculates a calibration value obtained by calibrating a ball-to-ball distance between two balls at respective ends of a plurality of edges of the inspection gauge 100. The CMM 200 calculates a calibration value by calibrating the ball-to-ball distance between two balls at respective ends of the plurality of edges by solving simultaneous equations including (i) ball-to-ball distances of the plurality of edges of the inspection gauge 100 when installed in the first posture, (ii) ball-to-ball distances of the plurality of edges of the inspection gauge 100 when installed in the second posture, (iii) ball-to-ball distances of the plurality of edges of the inspection gauge 100 when installed in the third posture, (iv) a calibration value (unknown number) obtained by calibrating the ball-to-ball distances between two balls at respective ends of the plurality of edges, and (v) a measurement error of the CMM at the measurement position identified in advance. Details will be described later. By adopting such a calibration method, a user does not need to measure all of the ball-to-ball distances of the inspection gauge 100 using the laser interferometer or the like, so that the time required for calibration work for calibrating the inspection gauge 100 can be reduced.

[Configuration of a CMM 200]

Figure 2:
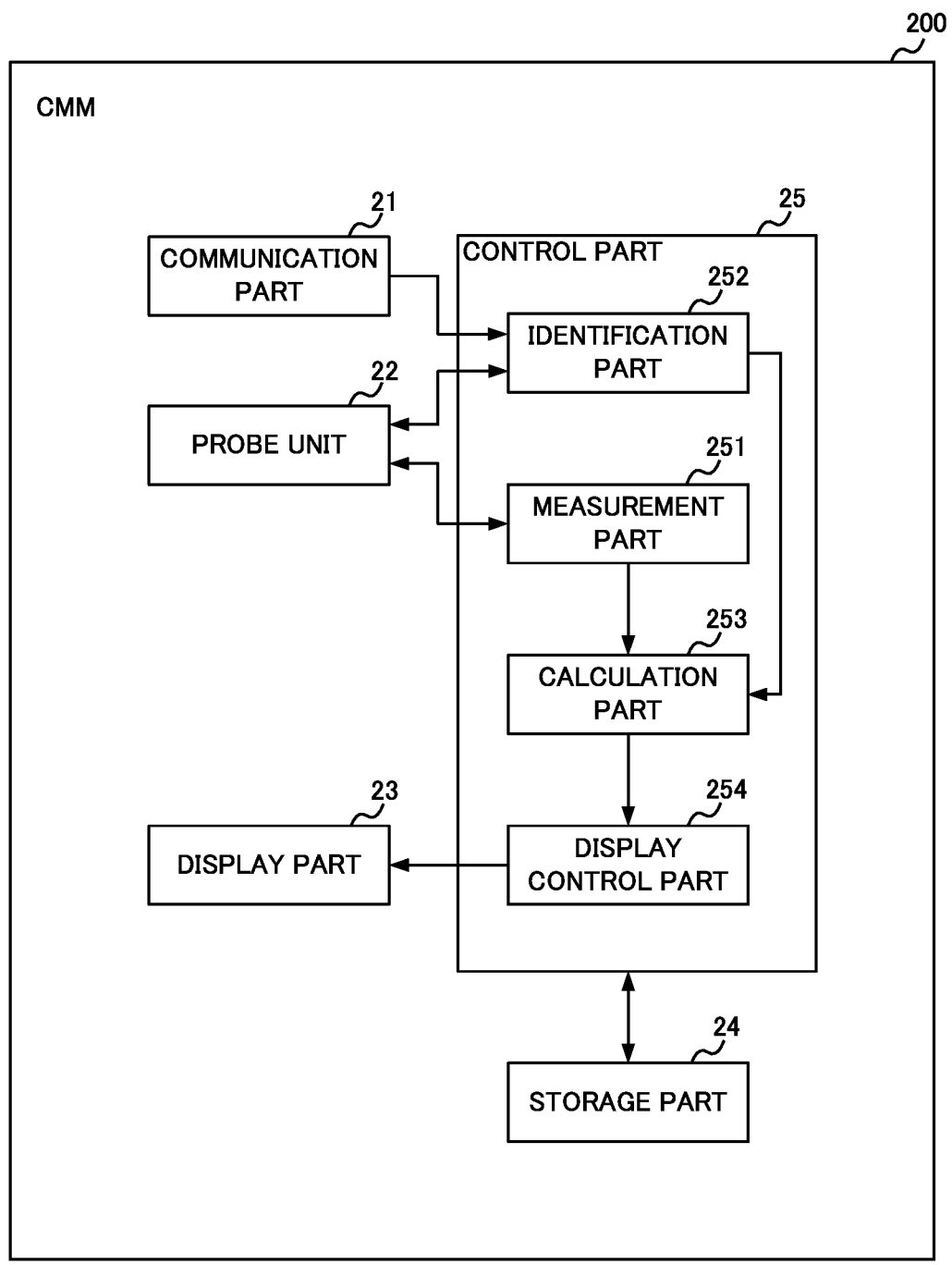
FIG. 2 shows a configuration of a CMM.

FIG. 2 shows a configuration of a CMM 200. The CMM 200 includes a communication part 21, a probe unit 22, a display part 23, a storage part 24, and a control part 25. The control part 25 includes a measurement part 251, an identification part 252, a calculation part 253, and a display control part 254.

The communication part 21 is a communication interface for communicating with other devices such as the laser interferometer. For example, the communication part 21 communicates with other devices by wireless communication such as a Wi-Fi (registered trademark). The communication part 21 may communicate with other devices via a cable such as a local area network (LAN).

The probe unit 22 includes a probe for contacting an object to be measured, a sensor for detecting that the probe has contacted the object to be measured, and a motor for moving the probe or changing an orientation of the probe. The probe unit 22 measures three-dimensional coordinates of a tip of the probe at the time of the probe contacting the object to be measured. The probe unit 22 inputs the measured three-dimensional coordinates to the measurement part 251. The display part 23 displays characters, an image, or the like.

The storage part 24 includes a storage medium such as a read only memory (ROM), a random access memory (RAM), a hard disk, or the like. The storage part 24 stores a program executed by the control part 25. The control part 25 functions as the measurement part 251, the identification part 252, the calculation part 253, and the display control part 254 by executing the program stored in the storage part 24.

The measurement part 251 measures the ball-to-ball distances of the inspection gauge 100 with the probe unit 22. More specifically, the measurement part 251 measures coordinates of the center of a ball by measuring three-dimensional coordinates of a plurality of contact positions where the probe contacts the ball of the inspection gauge 100.

The measurement part 251 measures coordinates of the center of each of the four balls of the inspection gauge 100 installed in the first posture. The measurement part 251 calculates distances between the centers of the four balls as the ball-to-ball distances. Among these distances, the measurement part 251 calculates, as the first ball-to-ball distance, a ball-to-ball distance between two balls at respective ends of the first edge corresponding to the measurement position. The measurement part 251 also calculates ball-to-ball distances corresponding to five edges other than the first edge of the inspection gauge 100 installed in the first posture.

Similarly, the measurement part 251 respectively calculates ball-to-ball distances between the centers of the four balls arranged at respective vertices of the inspection gauge 100 installed in the second posture. Among these distances, the measurement part 251 calculates, as the second ball-to-ball distance, a ball-to-ball distance between two balls at respective ends of the second edge corresponding to the measurement position. The measurement part 251 also calculates ball-to-ball distances corresponding to five edges other than the second edge of the inspection gauge 100 installed in the second posture.

Similarly, the measurement part 251 respectively calculates ball-to-ball distances between the centers of the four balls arranged at respective vertices of the inspection gauge 100 installed in the third posture. Among these distances, the measurement part 251 calculates, as the third ball-to-ball distance, a ball-to-ball distance between two balls at respective ends of the third edge corresponding to the measurement position. The measurement part 251 also calculates ball-to-ball distances corresponding to five edges other than the third edge of the inspection gauge 100 installed in the third posture. The measurement part 251 outputs information indicating the measured ball-to-ball distances to the calculation part 253.

[Identification of the Measurement Error]

Figure 3:
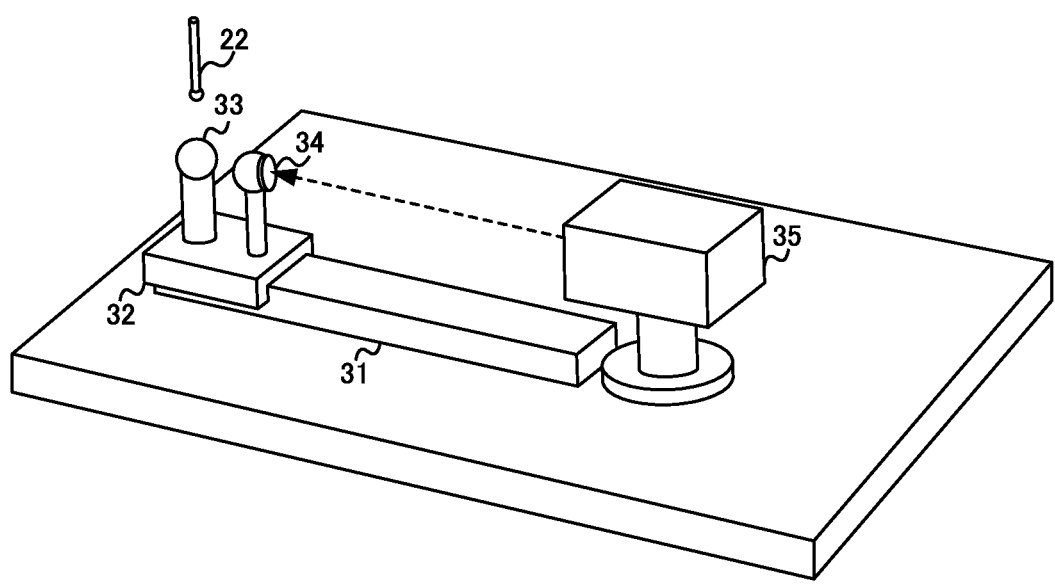
FIG. 3 shows how a measurement error is identified by an identification part.

The identification part 252 communicates with the laser interferometer via the communication part 21. The identification part 252 identifies in advance a measurement error of the CMM 200 at the measurement position. FIG. 3 shows how the measurement error is identified by the identification part 252. The identification part 252 measures the same distance at the measurement position using two devices, i.e., the probe unit 22 and the laser interferometer 35. By comparing measurement results measured by the two devices, the identification part 252 identifies a measurement error when the probe unit 22 performs the measurement.

In an example of FIG. 3, a rail 31 is installed at the same position as the measurement position (FIGS. 1A to 1C) of the measurement table of the CMM 200. It is supposed that a slider 32 that is movable on the rail 31 moves along the measurement position. An object to be measured 33 and a reflector 34 are fixed to the slider 32. The laser interferometer 35 is arranged such that its optical axis matches a direction in which the rail 31 extends. The optical axis of the laser interferometer 35 is defined by the center of a spherical portion of a tip of the object to be measured 33 and the center of a reflector plate of the reflector 34.

First, it is assumed that the slider 32 is at a first reference position on the rail 31. In a state in which the slider 32 is at the first reference position, a position of the spherical portion of the object to be measured 33 is approximately coincident with a position of the ball B (see FIG. 1A) arranged at one end of the first edge when the inspection gauge 100 is arranged in the first posture. The identification part 252 measures the coordinates of the spherical portion of the object to be measured 33 with the probe unit 22 in the state where the slider 32 is at the first reference position. As indicated by a broken line arrow in FIG. 3, a distance from the laser interferometer 35 to the reflector 34 is measured by the laser interferometer 35 in a state where the slider 32 is at the first reference position. The identification part 252 obtains, from the laser interferometer 35, a measurement result of the distance from the laser interferometer 35 to the reflector 34 when the slider 32 is at the first reference position.

Next, the slider 32 is moved to a second reference position on the rail 31. In a state in which the slider 32 is at the second reference position, the position of the spherical portion of the object to be measured 33 is approximately coincident with a position of the ball C (see FIG. 1A) arranged at one end of the first edge when the inspection gauge 100 is arranged in the first posture. The identification part 252 measures coordinates of the spherical portion of the object to be measured 33 with the probe unit 22 in the state where the slider 32 is at the second reference position. The distance from the laser interferometer 35 to the reflector 34 is measured by the laser interferometer 35 in the state where the slider 32 is at the second reference position. The identification part 252 obtains, from the laser interferometer 35, a measurement result of the distance from the laser interferometer 35 to the reflector 34 when the slider 32 is at the second reference position.

The identification part 252 calculates, as the calibration value, a reference distance from the first reference position to the second reference position on the basis of a difference between (i) the distance (broken line arrow in FIG. 3) from the laser interferometer 35 to the reflector 34 when the slider 32 is at the first reference position and (ii) the distance from the laser interferometer 35 to the reflector 34 when the slider 32 is at the second reference position.

The identification part 252 is not limited to an example in which the calibration value of the reference distance is measured by the laser interferometer 35. For example, the identification part 252 may measure the calibration value of the reference distance using a ball bar (not shown).

The identification part 252 calculates a measurement value of the reference distance from the first reference position to the second reference position on the basis of a difference between (i) coordinates of the object to be measured 33 measured by the probe unit 22 when the slider 32 is at the first reference position and (ii) coordinates of the object to be measured 33 measured by the probe unit 22 when the slider 32 is at the second reference position.

In the example of this disclosure, measurement accuracy of the laser interferometer 35 is higher than measurement accuracy of the probe unit 22. Therefore, the identification part 252 assumes that a difference between the calibration value measured by the laser interferometer 35 and the measurement value measured by the probe unit 22 is caused by the measurement error of the probe unit 22. The identification part 252 identifies a measurement error of the measurement value measured by the probe unit 22 at the measurement position on the basis of the difference between the calibration value of the reference distance measured by the laser interferometer 35 and the measurement value of the reference distance measured by the probe unit 22. The identification part 252 outputs the identified measurement error to the calculation part 253.

[Calculation of a Calibration Value of the Ball-to-Ball Distance]

The calculation part 253 calculates a calibration value by calibrating the ball-to-ball distance between two balls at respective ends of each edge of the inspection gauge 100. The calculation part 253 calculates calibration values $g_1$ to $g_6$ of the ball-to-ball distances of each edge of the regular tetrahedron of the inspection gauge 100 and measurement errors $m_1$ to $m_6$ that occur when the measurement part 251 measures the ball-to-ball distances of each edge of the regular tetrahedron of the inspection gauge 100 by solving the following Equation 1.

[Equation 1]

$$\begin{bmatrix} l_{\#1,1} \\ l_{\#1,2} \\ l_{\#1,3} \\ l_{\#1,4} \\ l_{\#1,5} \\ l_{\#1,6} \\ l_{\#2,3} \\ l_{\#2,1} \\ l_{\#2,2} \\ l_{\#2,6} \\ l_{\#2,4} \\ l_{\#2,5} \\ l_{\#3,6} \\ l_{\#3,3} \\ l_{\#3,5} \\ l_{\#3,1} \\ l_{\#3,2} \\ l_{\#3,4} \\ l_{2,scl} \end{bmatrix} = \begin{bmatrix} 1 & 0 & 0 & 0 & 0 & 0 & 1 & 0 & 0 & 0 & 0 & 0 \\ 0 & 1 & 0 & 0 & 0 & 0 & 0 & 1 & 0 & 0 & 0 & 0 \\ 0 & 0 & 1 & 0 & 0 & 0 & 0 & 0 & 1 & 0 & 0 & 0 \\ 0 & 0 & 0 & 1 & 0 & 0 & 0 & 0 & 0 & 1 & 0 & 0 \\ 0 & 0 & 0 & 0 & 1 & 0 & 0 & 0 & 0 & 0 & 1 & 0 \\ 0 & 0 & 0 & 0 & 0 & 1 & 0 & 0 & 0 & 0 & 0 & 1 \\ 1 & 0 & 0 & 0 & 0 & 0 & 0 & 0 & 1 & 0 & 0 & 0 \\ 0 & 1 & 0 & 0 & 0 & 0 & 1 & 0 & 0 & 0 & 0 & 0 \\ 0 & 0 & 1 & 0 & 0 & 0 & 0 & 1 & 0 & 0 & 0 & 0 \\ 0 & 0 & 0 & 1 & 0 & 0 & 0 & 0 & 0 & 0 & 0 & 1 \\ 0 & 0 & 0 & 0 & 1 & 0 & 0 & 0 & 0 & 1 & 0 & 0 \\ 0 & 0 & 0 & 0 & 0 & 1 & 0 & 0 & 0 & 0 & 1 & 0 \\ 1 & 0 & 0 & 0 & 0 & 0 & 0 & 0 & 0 & 0 & 0 & 1 \\ 0 & 1 & 0 & 0 & 0 & 0 & 0 & 0 & 1 & 0 & 0 & 0 \\ 0 & 0 & 1 & 0 & 0 & 0 & 0 & 0 & 0 & 0 & 1 & 0 \\ 0 & 0 & 0 & 1 & 0 & 0 & 1 & 0 & 0 & 0 & 0 & 0 \\ 0 & 0 & 0 & 0 & 1 & 0 & 0 & 1 & 0 & 0 & 0 & 0 \\ 0 & 0 & 0 & 0 & 0 & 1 & 0 & 0 & 0 & 1 & 0 & 0 \\ 0 & 1 & 0 & 0 & 0 & 0 & 0 & 0 & 0 & 0 & 0 & 0 \end{bmatrix} \times \begin{bmatrix} m_1 \\ m_2 \\ m_3 \\ m_4 \\ m_5 \\ m_6 \\ g_1 \\ g_2 \\ g_3 \\ g_4 \\ g_5 \\ g_6 \end{bmatrix} \quad (1)$$

In Equation 1, $m_j$ (j=1, 2, ..., 6) represents a measurement error (unknown number) when the probe unit 22 measures a ball-to-ball distance corresponding to the j-th position in a measurement coordinate system of the CMM 200.

Figure 4:
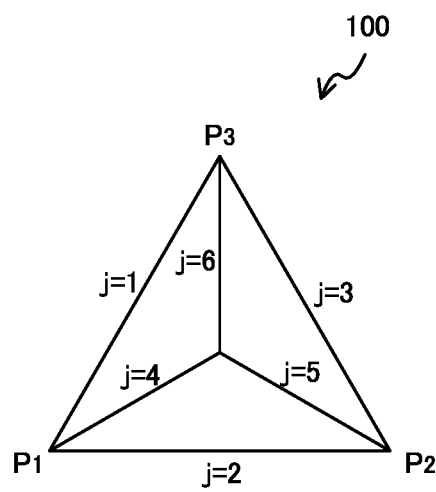
FIG. 4 shows an example of the j-th position of the inspection gauge.

FIG. 4 shows examples of the j-th position in the measurement coordinate system of the CMM 200. The inspection gauge 100 is installed such that vertices of the regular tetrahedron of the inspection gauge 100 are aligned with positions P1, P2, and P3, shown in FIG. 4, in the first posture, the second posture, and the third posture.

FIG. 4 shows the respective j-th (j=1, 2, ..., 6) positions in the measurement coordinate system of the CMM 200.

Figure 5A:
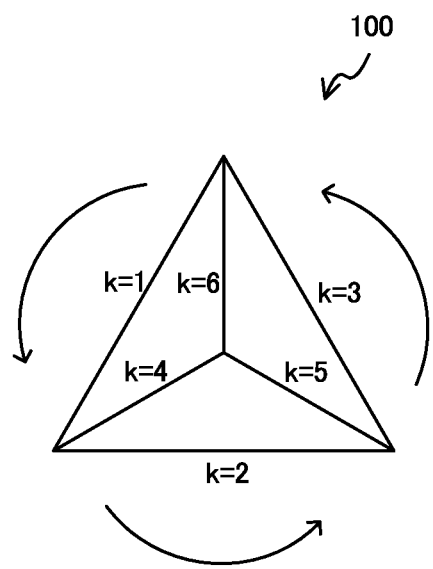
FIGS. 5A to 5C each show an example of a position of an edge of the inspection gauge corresponding to a subscript.
Figure 5B:
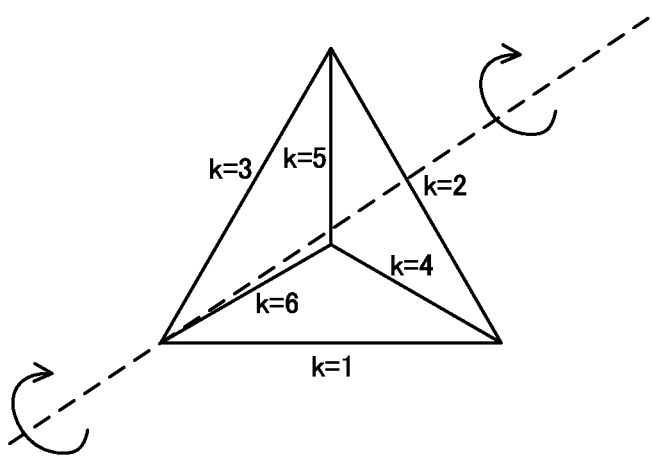
Figure 5C:
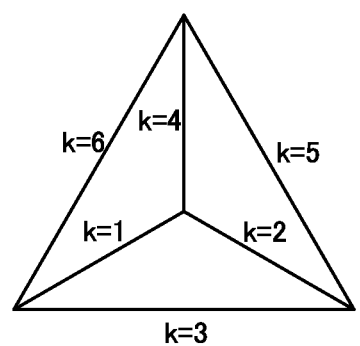

In Equation 1, $l_{\#i,k}$ (i=1, 2, 3, and k=1, 2, ..., 6) represents a measurement value obtained by the measurement part 251 measuring a ball-to-ball distance at the k-th position of the inspection gauge 100 arranged in the i-th posture. FIGS. 5A to 5C each show an example of the positions of the edges of the inspection gauge 100 corresponding to the subscript k. FIG. 5A shows the positions of the edges of the inspection gauge 100 corresponding to the subscript k (k=1, 2, ..., 6) when the inspection gauge 100 is arranged in the first posture (i=1). Arrows in FIG. 5A indicate a direction in which the inspection gauge 100 is rotated when installing the inspection gauge 100 in the second posture.

FIG. 5B shows the positions of the edges of the inspection gauge 100 corresponding to the subscript k (k=1, 2, ..., 6) when the inspection gauge 100 is arranged in the second posture (i=2). A broken line in FIG. 5B indicates the second rotational symmetry axis around which the inspection gauge 100 is rotated when installing the inspection gauge 100 in the third posture. Arrows in FIG. 5B indicate a direction in which the inspection gauge 100 is rotated when installing the inspection gauge 100 in the third posture. FIG. 5C shows the positions of the edges of the inspection gauge 100 corresponding to the subscript k (k=1, 2, ..., 6) when the inspection gauge 100 is arranged in the third posture (i=3). $g_k$ (k=1, 2, ..., 6) indicates a calibration value (unknown number) obtained by calibrating a ball-to-ball distance between two balls at respective ends of the k-th edge of the inspection gauge 100.

In Equation 1, $l_{2,scl}$ indicates a value identified by the identification part 252 for a measurement error when the measurement part 251 measures the ball-to-ball distance at the measurement position. The calculation part 253 calculates a calibration value $g_k$ and a measurement error $m_j$ of the ball-to-ball distance by solving simultaneous equations corresponding to a matrix shown in Equation 1. In the example of this disclosure, the calculation part 253 calculates the calibration value $g_k$ of the ball-to-ball distance by the method of least squares. Similarly, the calculation part 253 calculates the measurement error $m_j$ of the ball-to-ball distance by the method of least squares. In this manner, the calculation part 253 can calculate the most probable value as the calibration value $g_k$ or the like. The calculation part 253 outputs information indicating the calculated calibration value $g_k$ and the measurement error $m_j$ of the ball-to-ball distance to the display control part 254.

The display control part 254 displays characters, an image, or the like on the display part 23. The display control part 254 displays the calibration value $g_k$ and the measurement error $m_j$ of the ball-to-ball distance calculated by the calculation part 253.

[Calibration Procedure of the Inspection Gauge]

Figure 6:
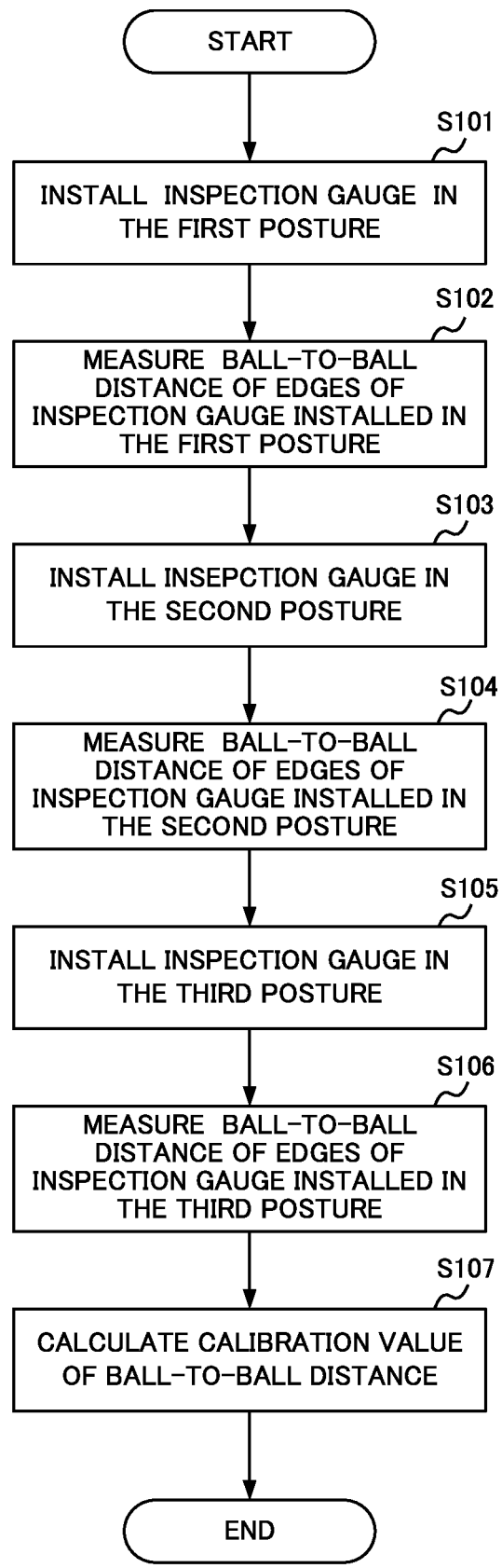
FIG. 6 is a flowchart showing a procedure for calibrating a ball-to-ball distance of the inspection gauge in the first embodiment.

FIG. 6 is a flowchart showing a procedure for calibrating the ball-to-ball distance of the inspection gauge 100 in the first embodiment. First, the inspection gauge 100 is installed in the first posture on the measurement table of the CMM 200 in which the measurement error at the measurement position of the first edge is identified (S101). The measurement part 251 measures each of the ball-to-ball distances between two balls at respective ends of the plurality of edges of the inspection gauge 100 installed in the first posture (S102). The inspection gauge 100 is rotated about the first rotational symmetry axis by 120 degrees and installed in the second posture (S103). The measurement part 251 measures each of the ball-to-ball distances between two balls at respective ends of the plurality of edges of the inspection gauge 100 installed in the second posture (S104).

Next, the inspection gauge 100 is rotated about the second rotational symmetry axis by 120 degrees and installed in the third posture (S105). The measurement part 251 measures each of the ball-to-ball distances between two balls at respective ends of the plurality of edges of the inspection gauge 100 installed in the third posture (S106). The calculation part 253 calculates the calibration value of the ball-to-ball distance by solving simultaneous equations including (i) the ball-to-ball distances of the plurality of edges of the inspection gauge 100 which are measured when installed in the first posture, (ii) the ball-to-ball distances of the plurality of edges of the inspection gauge 100 which are measured when installed in the second posture, (iii) the ball-to-ball distances between the plurality of edges of the inspection gauge 100 which are measured when installed in the third posture, (iv) a calibration value obtained by calibrating the ball-to-ball distances corresponding to the plurality of edges of the inspection gauge 100, and (v) a measurement error at the measurement position identified in advance (S107), and ends the process.

Second Embodiment

In the first embodiment, an example in which the measurement part 251 measures the ball-to-ball distances of the inspection gauge 100 installed in the first posture, the second posture, and the third posture has been described. On the other hand, in a second embodiment, the inspection gauge 100 is calibrated by measuring lengths of a total of two edges that are (i) one edge of a base and (ii) one edge of a surface other than the base and not included in the base, measured at two positions of the CMM calibrated with the reference instrument, and by measuring a distance between balls at respective ends of at least one other edge at an uncalibrated position in the CMM, in each of two postures. That is, the procedure of installing the inspection gauge 100 in a third posture is omitted, and the measurement part 251 measures the ball-to-ball distances of the inspection gauge 100 installed in a first posture and a second posture.

Figure 7A:
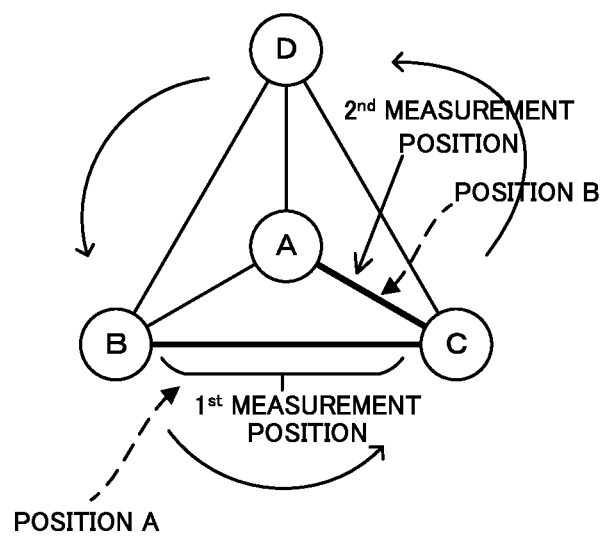
FIGS. 7A and 7B each show an outline of a calibration method according to a second embodiment.
Figure 7B:
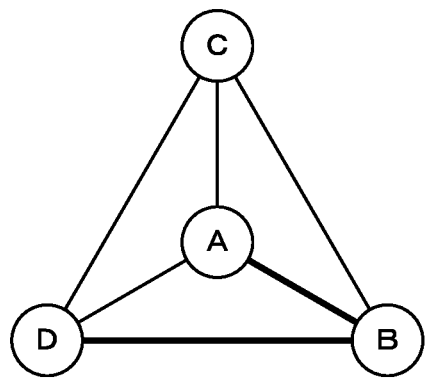

FIGS. 7A and 7B each show an outline of a calibration method according to the second embodiment of the present disclosure. FIG. 7A shows a state in which the inspection gauge 100 is installed in the first posture. FIG. 7B shows a state in which the inspection gauge 100 is installed in the second posture.

Similar to the first embodiment, the inspection gauge 100 is installed on the measurement table of the CMM 200 in the first posture. In the second embodiment, it is assumed that a measurement error in a case where the measurement part 251 measures ball-to-ball distances at a first measurement position (a position A indicated by a broken line arrow) and a second measurement position (a position B indicated by a broken line arrow), both indicated by a thick line in FIG. 7A, is identified in advance by the identification part 252 in the same manner as in the first embodiment. The measurement part 251 measures a first ball-to-ball distance between the balls B and C at respective ends of a first edge corresponding to the first measurement position among the plurality of edges of the inspection gauge 100 installed in the first posture. Similarly, the measurement part 251 measures a second ball-to-ball distance between the balls A and C at respective ends of a second edge corresponding to the second measurement position. The measurement part 251 also measures ball-to-ball distances corresponding to four edges other than the first edge and the second edge among the plurality of edges of the inspection gauge 100 installed in the first posture.

After the measurement part 251 has measured the ball-to-ball distances of the plurality of edges of the inspection gauge 100 installed in the first posture, the inspection gauge 100 is installed on the measurement table in the second posture in which the inspection gauge 100 is rotated about its rotational symmetry axis, as shown by arrows in FIG. 7A. The rotational symmetry axis is an axis extending approximately in the depth direction in FIG. 7A. The rotational symmetry axis passes through the ball A and is orthogonal to a plane including the ball B, the ball C, and the ball D. In an example of the second embodiment, when the plane (plane including the balls B, C, and D) orthogonal to the rotational symmetry axis in the inspection gauge 100 is a base, the first edge corresponding to the first measurement position is included in the base, but the second edge corresponding to the second measurement position is not included in the base. By arranging the first measurement position, the second measurement position, and the rotational symmetry axis for rotating the inspection gauge 100 in such a manner, the user can restrict an occurrence of rank deficiency in which the solution is not uniquely determined when calculating the ball-to-ball distance using an equation described later.

FIG. 7B shows how the inspection gauge 100 is installed in the second posture. In the second posture, an edge (edge sandwiched by the balls B and D, hereinafter also referred to as a third edge) different from the first edge and the second edge among the plurality of edges of the regular tetrahedron of the inspection gauge 100 moves such that it matches the first measurement position where the first edge is arranged in the first posture. At this time, an edge (edge sandwiched by the balls A and B, hereinafter also referred to as a fourth edge) different from the first edge, the second edge, and the third edge among the plurality of edges of the regular tetrahedron of the inspection gauge 100 matches the second measurement position where the second edge is arranged in the first posture.

The measurement part 251 measures a third ball-to-ball distance between the balls B and D at respective ends of the third edge corresponding to the first measurement position among the plurality of edges of the inspection gauge 100 installed in the second posture. The measurement part 251 measures a fourth ball-to-ball distance between the balls A and B at respective ends of the fourth edge corresponding to the second measurement position among the plurality of edges of the inspection gauge 100 installed in the second posture. The measurement part 251 also measures ball-to-ball distances corresponding to four edges other than the third edge and the fourth edge among the plurality of edges of the inspection gauge 100.

The calculation part 253 calculates a calibration value by calibrating the ball-to-ball distance between two balls at respective ends of the plurality of edges of the inspection gauge 100 by solving simultaneous equations including (i) the ball-to-ball distances of the plurality of edges of the inspection gauge 100 when installed in the first posture, (ii) the ball-to-ball distances between the plurality of edges of the inspection gauge 100 when installed in the second posture, (iii) a calibration value (unknown number) obtained by calibrating the ball-to-ball distances between two balls at respective ends of the plurality of edges of the inspection gauge 100, and (iv) a measurement error of the CMM 200 at the first measurement position and the second measurement position identified by the identification part 252.

The calculation part 253 calculates calibration values $g_1$ to $g_6$ of the ball-to-ball distance between the two balls at respective ends of each edge of the regular tetrahedron of the inspection gauge 100 and measurement errors $m_1$ to $m_6$ that occur when the measurement part 251 measures the ball-to-ball distances with the following Equation 2.

[Equation 2]

$$\begin{bmatrix} l_{\#1,1} \\ l_{\#1,2} \\ l_{\#1,3} \\ l_{\#1,4} \\ l_{\#1,5} \\ l_{\#1,6} \\ l_{\#2,3} \\ l_{\#2,1} \\ l_{\#2,2} \\ l_{\#2,6} \\ l_{\#2,4} \\ l_{\#2,5} \\ l_{2,scl} \\ l_{5,scl} \end{bmatrix} = \begin{bmatrix} 1 & 0 & 0 & 0 & 0 & 0 & 1 & 0 & 0 & 0 & 0 & 0 \\ 0 & 1 & 0 & 0 & 0 & 0 & 0 & 1 & 0 & 0 & 0 & 0 \\ 0 & 0 & 1 & 0 & 0 & 0 & 0 & 0 & 1 & 0 & 0 & 0 \\ 0 & 0 & 0 & 1 & 0 & 0 & 0 & 0 & 0 & 1 & 0 & 0 \\ 0 & 0 & 0 & 0 & 1 & 0 & 0 & 0 & 0 & 0 & 1 & 0 \\ 0 & 0 & 0 & 0 & 0 & 1 & 0 & 0 & 0 & 0 & 0 & 1 \\ 1 & 0 & 0 & 0 & 0 & 0 & 0 & 0 & 1 & 0 & 0 & 0 \\ 0 & 1 & 0 & 0 & 0 & 0 & 1 & 0 & 0 & 0 & 0 & 0 \\ 0 & 0 & 1 & 0 & 0 & 0 & 0 & 1 & 0 & 0 & 0 & 0 \\ 0 & 0 & 0 & 1 & 0 & 0 & 0 & 0 & 0 & 0 & 0 & 1 \\ 0 & 0 & 0 & 0 & 1 & 0 & 0 & 0 & 0 & 1 & 0 & 0 \\ 0 & 0 & 0 & 0 & 0 & 1 & 0 & 0 & 0 & 0 & 1 & 0 \\ 0 & 1 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 \end{bmatrix} \times \begin{bmatrix} m_1 \\ m_2 \\ m_3 \\ m_4 \\ m_5 \\ m_6 \\ g_1 \\ g_2 \\ g_3 \\ g_4 \\ g_5 \\ g_6 \end{bmatrix} \quad (2)$$

In Equation 2, $m_j$ (j=1, 2, . . . , 6) represents a measurement error (unknown number) when measuring a ball-to-ball distance corresponding to the j-th position by the probe unit 22 in the measurement coordinate system of the CMM 200. In Equation 2, $l_{\#i,k}$ (i=1, 2, 3, and k=1, 2, . . . , 6) represents a measurement value obtained by the measurement part 251 measuring a ball-to-ball distance at the k-th position of the inspection gauge 100 arranged in the i-th posture. $g_k$ (k=1, 2, . . . , 6) represents a calibration value (unknown number) obtained by calibrating a ball-to-ball distance between two balls at respective ends of the k-th edge of the inspection gauge 100. In Equation 2, $l_{2,scl}$ represents a value identified by the identification part 252 for a measurement error when the measurement part 251 measures the ball-to-ball distance at the first measurement position. In Equation 2, $l_{5,scl}$ represents a value identified by the identification part 252 for a measurement error when the measurement part 251 measures the ball-to-ball distance at the second measurement position.

[Calibration Procedure of the Inspection Gauge]

Figure 8:
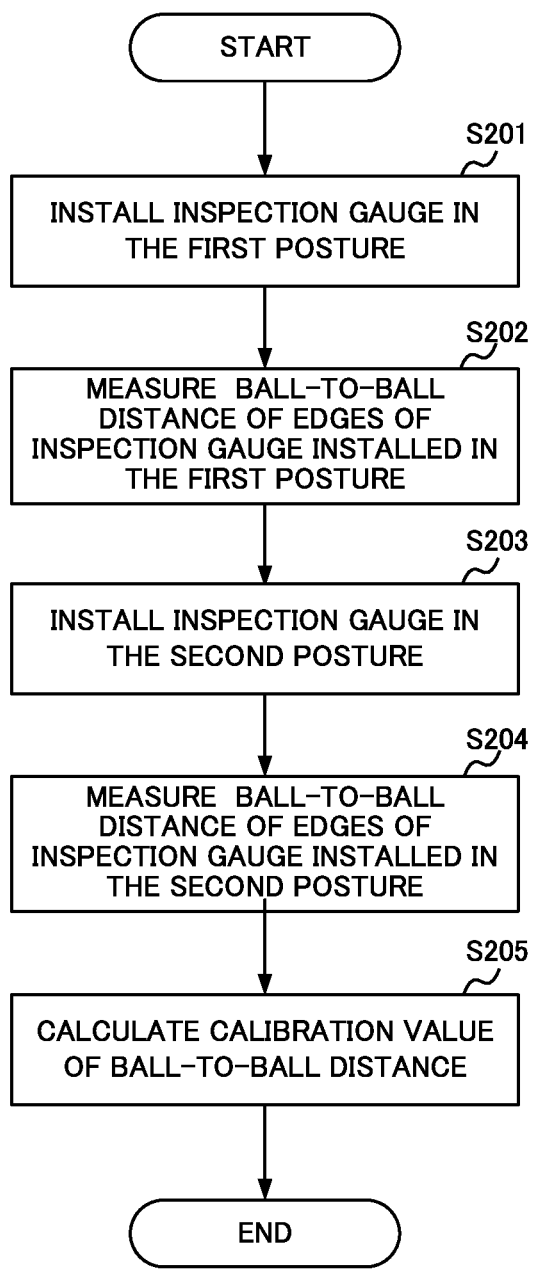
FIG. 8 is a flowchart showing a procedure for calibrating the ball-to-ball distance of the inspection gauge in the second embodiment.

FIG. 8 is a flowchart showing a procedure for calibrating the ball-to-ball distance of the inspection gauge 100 in the second embodiment. First, the inspection gauge 100 is installed in the first posture on the measurement table of the CMM 200 in which measurement errors are identified at the first measurement position and the second measurement position (S201). The measurement part 251 measures each of the ball-to-ball distances between two balls at respective ends of the plurality of edges of the inspection gauge 100 installed in the first posture (S202).

Next, the inspection gauge 100 is rotated about its rotational symmetry axis by 120 degrees and installed in the second posture (S203). The measurement part 251 measures each of the ball-to-ball distances between two balls at respective ends of the plurality of edges of the inspection gauge 100 installed in the second posture (S204).

The calculation part 253 calculates a calibration value by calibrating the ball-to-ball distances between two balls at respective ends of the plurality of edges of the inspection gauge 100 by solving simultaneous equations including (i) the ball-to-ball distances of the plurality of edges of the inspection gauge 100 installed in the first posture, (ii) the ball-to-ball distances of the plurality of edges of the inspection gauge 100 installed in the second posture, (iii) calibration values obtained by calibrating the ball-to-ball distances corresponding to the plurality of edges of the inspection gauge 100, and (iv) measurement errors at the measurement positions identified in advance (S205), and ends the process.

In the first and second embodiments, examples where the calculation part 253 of the CMM 200 calculates the calibration value obtained by calibrating the ball-to-ball distances corresponding to the plurality of edges of the inspection gauge 100 have been described. However, the present disclosure is not limited to the examples in which the CMM 200 includes the calculation part 253. For example, a calibration apparatus (not shown) different from the CMM 200 may be provided with a calculation part, and the calculation part may calculate a calibration value obtained by calibrating the ball-to-ball distances corresponding to the plurality of edges of the inspection gauge 100.

In the first embodiment, an example has been described in which the measurement part 251 measures the ball-to-ball distances of the inspection gauge 100 installed in the first posture, the second posture, and the third posture. However, the present disclosure is not limited to this, and the user may increase the number of times the posture of the inspection gauge 100 is changed. For example, the measurement part 251 may measure the ball-to-ball distance of the inspection gauge 100 installed in the first posture, the second posture, the third posture, and the fourth posture. In this manner, the calculation part 253 can increase redundancy of the calibration value to be calculated for the ball-to-ball distance of the inspection gauge 100, and reduce influences of measurement noise in the calculation of the calibration value.

[Effect of the Calibration Method of the Present Disclosure]

According to the calibration method of the present disclosure, the calculation part 253 calculates the calibration value of the ball-to-ball distances by solving simultaneous equations. By adopting such a calibration method, the user does not need to measure all the ball-to-ball distances of the inspection gauge 100 using the laser interferometer 35 or the like, so that the time required for calibration work for calibrating the inspection gauge 100 can be reduced.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured to be functionally or physically distributed and integrated in arbitrary units. Further, new exemplary embodiments generated by arbitrary combinations of them are included in the exemplary embodiments of the present disclosure. The effect of the new embodiment caused by the combination has the effect of the original embodiment together.

What is claimed is:

1. A calibration method for calibrating an inspection gauge in which a ball is arranged at each vertex of a regular tetrahedron, the method comprising:
    installing the inspection gauge in a first posture on a measurement table of a CMM;
    measuring a ball-to-ball distance of a plurality of edges of the inspection gauge installed in the first posture using the CMM in which a measurement error at a measurement position, where a first edge among the plurality of edges of the inspection gauge installed in the first posture is located, is identified;
    installing the inspection gauge on the measurement table in a second posture in which a second edge different from the first edge among the plurality of edges matches the measurement position where the first edge was in the first posture by rotating the inspection gauge about a first rotational symmetry axis after measuring the ball-to-ball distance of the plurality of edges;
    measuring a ball-to-ball distance of a plurality of edges of the inspection gauge installed in the second posture using the CMM;
    installing the inspection gauge on the measurement table in a third posture in which a third edge different from the first edge and the second edge among the plurality of edges matches the measurement position by rotating the inspection gauge about a second rotational symmetry axis different from the first rotational symmetry axis after measuring the ball-to-ball distance of the plurality of edges of the inspection gauge installed in the second posture;
    measuring a ball-to-ball distance of a plurality of edges of the inspection gauge installed in the third posture using the CMM; and
    calculating a calibration value calibrating a ball-to-ball distance between two balls at respective ends of a plurality of edges of the inspection gauge by solving simultaneous equations including the ball-to-ball distance of the plurality of edges of the inspection gauge installed in the first posture, the ball-to-ball distance of the plurality of edges of the inspection gauge installed in the second posture, the ball-to-ball distance of the plurality of edges of the inspection gauge installed in the third posture, and the measurement error of the CMM at the measurement position.

2. The calibration method according to claim 1, wherein the measuring the ball-to-ball distance of the plurality of edges of the inspection gauge installed in the first posture includes measuring ball-to-ball distances of six edges of the inspection gauge installed in the first posture,
    the measuring the ball-to-ball distance of the plurality of edges of the inspection gauge installed in the second posture includes measuring ball-to-ball distances of six edges of the inspection gauge installed in the second posture, and
    the measuring the ball-to-ball distance of the plurality of edges of the inspection gauge installed in the third posture includes measuring ball-to-ball distances of six edges of the inspection gauge installed in the third posture.

3. The calibration method according to claim 1, wherein the calculating the calibration value calibrating the ball-to-ball distance between the two balls at respective ends of the plurality of edges of the inspection gauge includes calculating the calibration value of the ball-to-ball distance of each edge of the regular tetrahedron of the inspection gauge and the measurement error that occurs when the ball-to-ball distance of each edge of the regular tetrahedron of the inspection gauge is measured by solving the following Simultaneous Equations 1,

[Equation 1]

$$\begin{bmatrix} l_{\#1,1} \\ l_{\#1,2} \\ l_{\#1,3} \\ l_{\#1,4} \\ l_{\#1,5} \\ l_{\#1,6} \\ l_{\#2,3} \\ l_{\#2,1} \\ l_{\#2,2} \\ l_{\#2,6} \\ l_{\#2,4} \\ l_{\#2,5} \\ l_{\#3,6} \\ l_{\#3,3} \\ l_{\#3,5} \\ l_{\#3,1} \\ l_{\#3,2} \\ l_{\#3,4} \\ l_{2,scl} \end{bmatrix} = \begin{bmatrix} 1 & 0 & 0 & 0 & 0 & 0 & 1 & 0 & 0 & 0 & 0 & 0 \\ 0 & 1 & 0 & 0 & 0 & 0 & 0 & 1 & 0 & 0 & 0 & 0 \\ 0 & 0 & 1 & 0 & 0 & 0 & 0 & 0 & 1 & 0 & 0 & 0 \\ 0 & 0 & 0 & 1 & 0 & 0 & 0 & 0 & 0 & 1 & 0 & 0 \\ 0 & 0 & 0 & 0 & 1 & 0 & 0 & 0 & 0 & 0 & 1 & 0 \\ 0 & 0 & 0 & 0 & 0 & 1 & 0 & 0 & 0 & 0 & 0 & 1 \\ 1 & 0 & 0 & 0 & 0 & 0 & 0 & 0 & 1 & 0 & 0 & 0 \\ 0 & 1 & 0 & 0 & 0 & 0 & 1 & 0 & 0 & 0 & 0 & 0 \\ 0 & 0 & 1 & 0 & 0 & 0 & 0 & 1 & 0 & 0 & 0 & 0 \\ 0 & 0 & 0 & 1 & 0 & 0 & 0 & 0 & 0 & 0 & 0 & 1 \\ 0 & 0 & 0 & 0 & 1 & 0 & 0 & 0 & 0 & 1 & 0 & 0 \\ 0 & 0 & 0 & 0 & 0 & 1 & 0 & 0 & 0 & 0 & 1 & 0 \\ 1 & 0 & 0 & 0 & 0 & 0 & 0 & 0 & 0 & 0 & 0 & 1 \\ 0 & 1 & 0 & 0 & 0 & 0 & 0 & 0 & 1 & 0 & 0 & 0 \\ 0 & 0 & 1 & 0 & 0 & 0 & 0 & 0 & 0 & 0 & 1 & 0 \\ 0 & 0 & 0 & 1 & 0 & 0 & 1 & 0 & 0 & 0 & 0 & 0 \\ 0 & 0 & 0 & 0 & 1 & 0 & 0 & 1 & 0 & 0 & 0 & 0 \\ 0 & 0 & 0 & 0 & 0 & 1 & 0 & 0 & 0 & 1 & 0 & 0 \\ 0 & 1 & 0 & 0 & 0 & 0 & 0 & 0 & 0 & 0 & 0 & 0 \end{bmatrix} \times \begin{bmatrix} m_1 \\ m_2 \\ m_3 \\ m_4 \\ m_5 \\ m_6 \\ g_1 \\ g_2 \\ g_3 \\ g_4 \\ g_5 \\ g_6 \end{bmatrix} \quad (1)$$

where $m_j$ (j=1, 2, ..., 6) represents the measurement error when a ball-to-ball distance corresponding to the j-th position is measured and $l_{\#i,k}$ (i=1, 2, 3, and k=1, 2, ..., 6) represents a measurement value when the ball-to-ball distance is measured at the k-th position of the inspection gauge arranged in the i-th posture in Equation 1.

4. A calibration method for calibrating an inspection gauge in which a ball is arranged at each vertex of a regular tetrahedron, the method comprising:
    installing the inspection gauge in a first posture on a measurement table of a CMM;
    measuring a ball-to-ball distance of a plurality of edges of the inspection gauge installed in the first posture by the CMM in which a measurement error at a first measurement position, where a first edge included in a base of the regular tetrahedron among the plurality of edges of the inspection gauge installed in the first posture is located, and the measurement error at a second measurement position, where a second edge not included in the base is located, are identified;

installing, on the measurement table, the inspection gauge in a second posture in which a third edge different from the first edge and the second edge among the plurality of edges matches the first measurement position where the first edge was in the first posture and a fourth edge different from the first edge, the second edge, and the third edge matches the second measurement position where the second edge was in the second posture by rotating the inspection gauge about a rotational symmetry axis orthogonal to the base after measuring the ball-to-ball distance of the plurality of edges of the inspection gauge installed in the first posture;

measuring a ball-to-ball distance of a plurality of edges of the inspection gauge installed in the second posture by the CMM; and calculating a calibration value calibrating a ball-to-ball distance between two balls at respective ends of a plurality of edges of the inspection gauge by solving simultaneous equations including the ball-to-ball distance of the plurality of edges of the inspection gauge installed in the first posture, the ball-to-ball distance of the plurality of edges of the inspection gauge installed in the second posture, and the measurement error of the CMM at the first measurement position and the second measurement position.

5. The calibration method according to claim 3, wherein the measuring the ball-to-ball distance of the plurality of edges of the inspection gauge installed in the first posture includes measuring ball-to-ball distances of six edges of the inspection gauge installed in the first posture, and the measuring the ball-to-ball distance of the plurality of edges of the inspection gauge installed in the second posture includes measuring ball-to-ball distances of six edges of the inspection gauge installed in the second posture.

6. The calibration method according to claim 4, wherein the calculating the calibration value calibrating the ball-to-ball distance between the two balls at respective ends of the plurality of edges of the inspection gauge includes calculating the calibration value of a ball-to-ball distance between two balls at respective ends of each edge of the regular tetrahedron of the inspection gauge and the measurement error that occurs when the ball-to-ball distance is measured by solving the following Simultaneous Equations 2,

[Equation 2]

$$\begin{bmatrix} l_{\#1,1} \\ l_{\#1,2} \\ l_{\#1,3} \\ l_{\#1,4} \\ l_{\#1,5} \\ l_{\#1,6} \\ l_{\#2,3} \\ l_{\#2,1} \\ l_{\#2,2} \\ l_{\#2,6} \\ l_{\#2,4} \\ l_{\#2,5} \\ l_{2,scl} \\ l_{5,scl} \end{bmatrix} = \begin{bmatrix} 1 & 0 & 0 & 0 & 0 & 0 & 1 & 0 & 0 & 0 & 0 & 0 \\ 0 & 1 & 0 & 0 & 0 & 0 & 0 & 1 & 0 & 0 & 0 & 0 \\ 0 & 0 & 1 & 0 & 0 & 0 & 0 & 0 & 1 & 0 & 0 & 0 \\ 0 & 0 & 0 & 1 & 0 & 0 & 0 & 0 & 0 & 1 & 0 & 0 \\ 0 & 0 & 0 & 0 & 1 & 0 & 0 & 0 & 0 & 0 & 1 & 0 \\ 0 & 0 & 0 & 0 & 0 & 1 & 0 & 0 & 0 & 0 & 0 & 1 \\ 1 & 0 & 0 & 0 & 0 & 0 & 0 & 0 & 1 & 0 & 0 & 0 \\ 0 & 1 & 0 & 0 & 0 & 0 & 1 & 0 & 0 & 0 & 0 & 0 \\ 0 & 0 & 1 & 0 & 0 & 0 & 0 & 1 & 0 & 0 & 0 & 0 \\ 0 & 0 & 0 & 1 & 0 & 0 & 0 & 0 & 0 & 0 & 0 & 1 \\ 0 & 0 & 0 & 0 & 1 & 0 & 0 & 0 & 0 & 1 & 0 & 0 \\ 0 & 0 & 0 & 0 & 0 & 1 & 0 & 0 & 0 & 0 & 1 & 0 \\ 0 & 1 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 \end{bmatrix} \times \begin{bmatrix} m_1 \\ m_2 \\ m_3 \\ m_4 \\ m_5 \\ m_6 \\ g_1 \\ g_2 \\ g_3 \\ g_4 \\ g_5 \\ g_6 \end{bmatrix} \quad (2)$$

where $m_j$ (j=1, 2, ..., 6) represents the measurement error when a ball-to-ball distance corresponding to the j-th position is measured, $l_{\#i,k}$ (i=1, 2, 3, and k=1, 2, ..., 6) represents a measurement value when the ball-to-ball distance is measured at the k-th position of the inspection gauge arranged in the i-th posture, gk (k=1, 2, ..., 6) represents the calibration value obtained by calibrating the ball-to-ball distance between two balls at respective ends of the k-th edge of the inspection gauge, $l_{2,scl}$ represents a value obtained by identifying the measurement error when the ball-to-ball distance is measured at the first measurement position, and $l_{5,scl}$ represents a value obtained by identifying the measurement error when the ball-to-ball distance is measured at the second measurement position in Equation 2.

7. The calibration method according to claim 1, wherein the calculating the calibration value includes calculating the calibration value by the method of least squares.

8. The calibration method according to claim 1 further comprising identifying a measurement error using a laser interferometer.

* * * * *